Dec. 30, 1924.

E. S. SAWTELLE 1,521,565

POWER TRANSMISSION MECHANISM

Filed Jan. 14, 1924

Inventor

Elmer S. Sawtelle

By Word & Word

Attorneys

Patented Dec. 30, 1924.

1,521,565

UNITED STATES PATENT OFFICE.

ELMER S. SAWTELLE, OF CINCINNATI, OHIO, ASSIGNOR TO THE TOOL STEEL GEAR & PINION COMPANY, OF ELMWOOD PLACE, OHIO, A CORPORATION OF OHIO.

POWER-TRANSMISSION MECHANISM.

Application filed January 14, 1924. Serial No. 685,985.

*To all whom it may concern:*

Be it known that I, ELMER S. SAWTELLE, a citizen of the United States, and residing at Cincinnati, in the county of Hamilton and State of Ohio, have invented a new and useful Power-Transmission Mechanism, of which the following specification is a full disclosure.

My invention primarily relates to power transmission mechanisms and particularly to intermeshing gears for transmitting power from a driving to a driven shaft where the conditions of usage are severe and uneven strains inherent from the relationship of the gearing to the shafts and their bearings.

The specific problem to which this invention is directed arises when, due to a flex in the shafting or undue play in the parts or bearings, the gear and pinion contact one another at a slight angle. Industrially, this problem is most acute in the electric railway art. There the gear is normally mounted on the axle of the car wheels, the pinion is on the armature shaft which is not journaled beyond the pinion. The effect of this unjournaled end pinion construction is to gradually cause disalignment of the pinion shaft. Consequently, the mesh of the gear teeth nearest the motor becomes deeper than that of the outside portion of the teeth, the latter being partially out of mesh. The deeper meshed portion of the pinion teeth, therefore, carries practically the entire load and the relatively unmeshed portion almost none of the load. Also, the pinion being smaller wears out faster than the gear, the ratio being approximately that of the relative sizes of the gear and pinion. Thus a small part of the pinion is subjected to very unusual and extreme stress and wear.

Surfaced hardened or tool steel gears and pinions have been found to be peculiarly advantageous and uniquely adapted to the herein disclosed solution of said problem. However under the above conditions of unusual and unequal strains the hardened surface of the pinion tends to chip off on the motor end, thereby destroying the utility of the pinion.

One object of my invention is to provide a tool steel gear and pinion combination which will not chip when the pinion is mounted on an unjournaled end.

Another object of my invention is to provide a pinion with the well known case hardened tool steel advantages which will accommodate itself to all conditions of unequal mesh. That is to say, my invention contemplates a variably tempered case hardened steel gear that will so react to conditions of harsh usage and uneven strains and load as to maintain a substantial uniformity of the effective intermesh.

I accomplish this result by constituting a compensating relationship of variably tempered zones to the region of inequality and maximum load thrust.

Another object of my invention is to provide a tool steel gear or pinion with one end of tool steel, the opposing end relatively soft and a zone of varying metal hardness between said ends.

I have discovered that in use, under conditions of disalignment, the soft metal of each tooth yields instead of chipping, thereby throwing the load gradually more and more onto the harder metal and over a greater and greater portion of the length of the pinion. The burden on the metal is thus spread over a larger area and made to vary with the metal's hardness.

Great difficulty has been experienced in providing a pinion or gear of the above described nature. Such a pinion can only be tested out in commercial use under a traction car. The most perplexing difficulty has been to get dependable results and a reliable uniformity and standardization of product, involving repeated experiments and prolonged observation and determination based on data only obtainable from duration service. If any portion of the soft end of the pinion or gear has the tool steel finish still remaining, that portion chips and thereby starts the disintegration of the pinion or gear. Consequently the process by which these pinions are made determines the efficiency of the combination of the gear and a pinion operating on the unjournaled end.

Therefore, still another object of my invention is to provide a process by means of which one can produce a pinion with one end tool steel and the opposite end relatively soft metal.

Still another object is to provide a process by means of which can be produced a pinion having one zone of tool steel surface, an opposed end zone of relatively soft metal, and an intermediate zone in which the metal hardness varies between the two.

Other objects and certain advantages will be more fully set forth in the description of the drawings forming a part of this specification, in which drawings.

Figures 1, 2, 3:
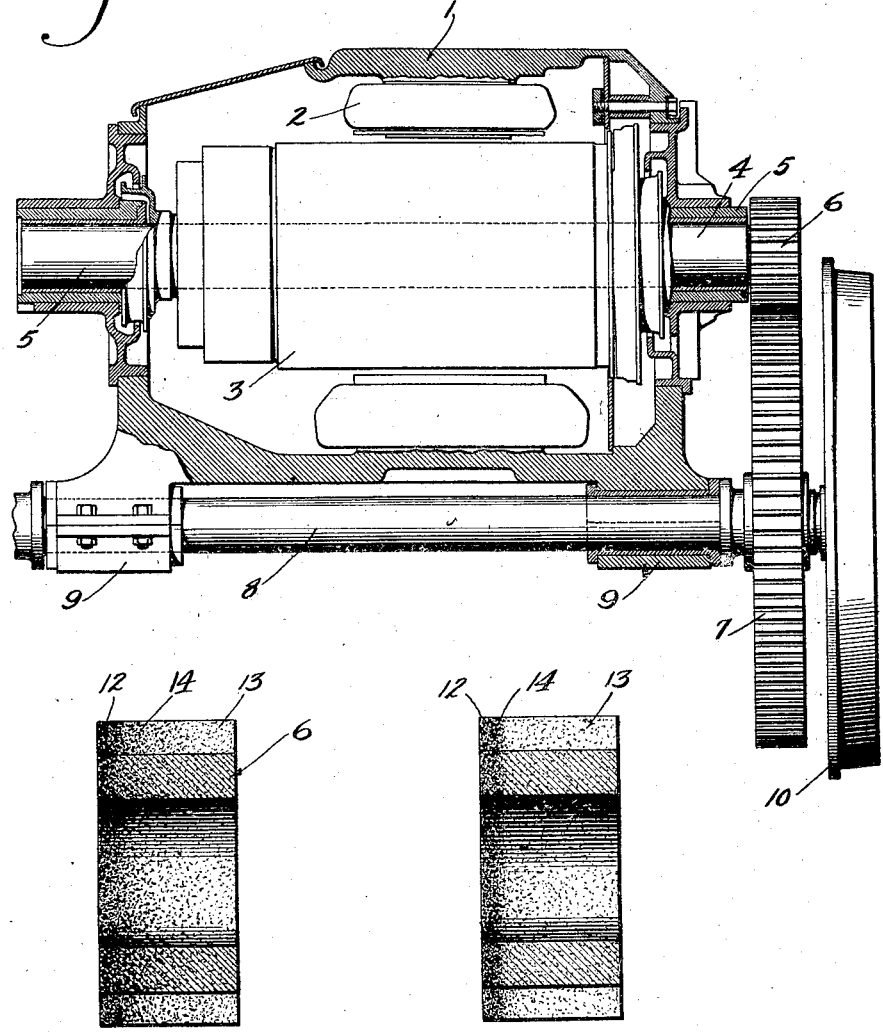
Figure 1 is a longitudinal sectional view through a geared railway motor, certain parts being shown in plan.
Figure 2 is an enlarged sectional view of a pinion with a relatively sharp line of demarkation between hard and soft metal.
Figure 3 is an enlarged section of a pinion showing an intermediate zone of variable hardness between the hard and soft metal.

A motor 1 comprises a field 2, an armature 3, an armature shaft 4, bearings 5 for said armature shaft 4, said armature shaft extending beyond the motor, a pinion 6 mounted on said armature shaft, a gear 7 in mesh with said pinion, said gear mounted on an axle 8 journaled in bearings 9 and having attached to it car wheels 10.

The pinion 6 itself has a surface hardening. This surface hardening extends to a maximum depth of approximately ⅙ of the thickness of the tooth at the pitch line.

At one end 12 of said pinion 6 the temper is drawn from the tool steel finish by a process hereafter described which gives a gear of the following description:

In the end zone 13 the tool steel is relatively hard and in the end zone 12 the steel is relatively soft, and intermediate is a zone 14 of metal hardness varying between that of the zones 12 and 13. In Figure 2 this zone 14 is very narrow and amounts almost to a line. In Figure 3 this zone 14 is comparatively extended. The extent of this zone 14 can readily be approximately controlled by varying the time element in one step of the hereafter described process.

My process consists in dipping the completely case hardened tool steel gear or pinion in a path of molten metal of low melting point, such as lead or Babbitt metal. Commercially 1000° F. is considered a suitable temperature for this bath. In practice about one-eighth of the pinion is dipped. The period of the bath depends on how much of the temper is to be taken out of the pinion. Between thirty seconds and one minute is found to be satisfactory.

The effect of this operation is to withdraw the temper not only from the portion of the pinion dipped but also from a portion immediately above. This latter result is due to the rising of the heat from the molten metal both through and around the metal of the pinion. The degree of heat and its resulting untempering at any given point varies with the distance from the surface of the molten metal.

After being withdrawn from the lead bath, the pinions are immersed in water. The length of time elapsing between the lead and water treatments can be varied and by it is determined the extent of the intermediate zone. The greater the time the more the heat will travel upward and withdraw the temper, thereby extending the intermediate zone.

It is obvious that my solution of the problem of compensating for unequal mesh may have various applications and uses, and I desire to be limited only by the following claims:

Having described my invention, I claim:

1. In combination, a driving shaft and a driven shaft, one of said shafts being unjournaled at one end, intermeshed gear wheels mounted on said shafts, one on said unjournaled end, gear teeth on one of said gear wheels each having an end portion of tool steel and the other end portion relatively soft in order to make compensation for disalignment in the shafting.

2. In combination, a driving shaft and a driven shaft substantially parallel thereto, one of said shafts being unjournaled at one end, intermeshed gear wheels mounted on said shafts, one on said unjournaled end, gear teeth on one of said gear wheels each having an end zone of tool steel, an opposite end zone of soft metal and an intermediate zone of varying hardness, in order to make compensation for disalignment in the shafting.

In witness whereof, I hereunto subscribe my name, as attested by the two subscribing witnesses.

ELMER S. SAWTELLE.

Witnesses:
  R. KISTNER,
  C. REED.